US010579316B2

(12) United States Patent
Mori

(10) Patent No.: US 10,579,316 B2
(45) Date of Patent: Mar. 3, 2020

(54) IMAGE PROCESSING APPARATUS THAT PERFORMS RENDERING PROCESSING, METHOD OF RENDERING PROCESSING, AND STORAGE MEDIUM

(71) Applicant: CANON KABUSHIKI KAISHA, Tokyo (JP)

(72) Inventor: Hiroshi Mori, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/017,059

(22) Filed: Jun. 25, 2018

(65) Prior Publication Data

US 2019/0004755 A1 Jan. 3, 2019

(30) Foreign Application Priority Data

Jun. 30, 2017 (JP) ................................ 2017-129154

(51) Int. Cl.
*G06F 3/12* (2006.01)
*H04N 1/00* (2006.01)

(52) U.S. Cl.
CPC ............ *G06F 3/1247* (2013.01); *G06F 3/122* (2013.01); *G06F 3/1297* (2013.01); *H04N 1/00883* (2013.01)

(58) Field of Classification Search
USPC ......................................................... 358/1.13
See application file for complete search history.

(56) References Cited

U.S. PATENT DOCUMENTS 5,778,092 A * 7/1998 MacLeod ........... H04N 1/40062 358/426.04
7,239,407 B1 * 7/2007 Lapstun ................. B41J 2/0057 358/1.15
2005/0219634 A1 * 10/2005 Murakami ......... H04N 1/00838 358/3.28

(Continued)

FOREIGN PATENT DOCUMENTS

JP 2013004032 A 1/2013

*Primary Examiner* — Tammy Paige Goddard
*Assistant Examiner* — Darryl V Dottin
(74) *Attorney, Agent, or Firm* — Carter, DeLuca & Farrell LLP

(57) ABSTRACT

An image processing apparatus that performs rendering processing for forming an image by a scan line method, including: a span processing unit configured to generate span data corresponding to a span demarcated by a contour of an object existing on a scan line; an elimination unit configured to perform elimination processing of an object unnecessary for drawing in the span for the generated span data; and a generation unit configured to generate a bitmap image in units of pages by using pixel data necessary for drawing of each span based on the span data after the elimination processing, wherein the generation unit generates, in a case where a part of a specific image object within a page is eliminated by the elimination processing, the pixel data necessary for drawing of each span is generated by acquiring the pixel data corresponding to the part from a FIFO memory and then discarding the acquired pixel data corresponding to the part in accordance with instructions to read and discard the part included in the span data after the elimination processing.

14 Claims, 13 Drawing Sheets

(56) References Cited

U.S. PATENT DOCUMENTS

| | | | | |
|---|---|---|---|---|
| 2007/0030528 | A1* | 2/2007 | Quaeler | G06F 17/24 358/453 |
| 2011/0058191 | A1* | 3/2011 | Tokumoto | G06K 15/02 358/1.9 |

* cited by examiner

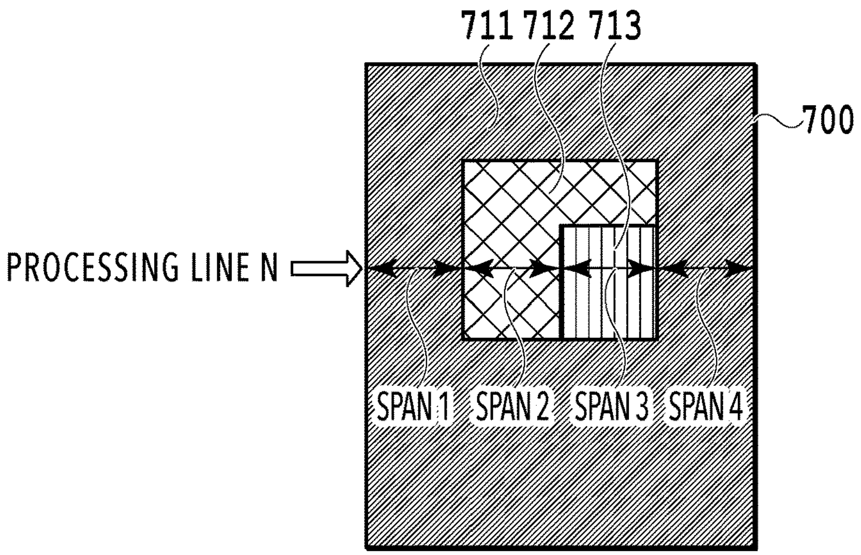

FIG.8A

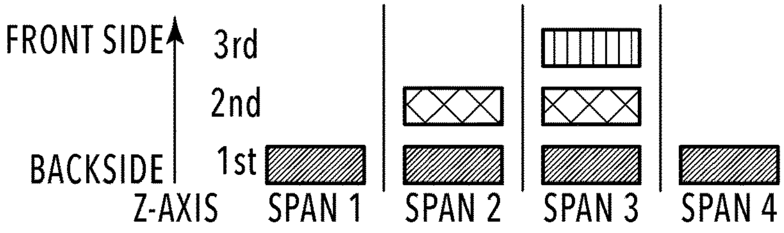

FIG.8B

PROCESSING LINE N

| | | | | |
|---|---|---|---|---|
| SPAN 1 | Pixel length: 1260pix Object number: 1 | Fill type: image (backside) Combination: overwriting | | |
| SPAN 2 | Pixel length: 1300pix Object number: 2 | Fill type: image (backside) Combination: overwriting | Fill type: image Combination: overwriting | |
| SPAN 3 | Pixel length: 1150pix Object number: 3 | Fill type: image (backside) Combination: overwriting | Fill type: image Combination: overwriting | Fill type: image Combination: overwriting |
| SPAN 4 | Pixel length: 1250pix Object number: 1 | Fill type: image (backside) Combination: overwriting | | |

FIG.8C

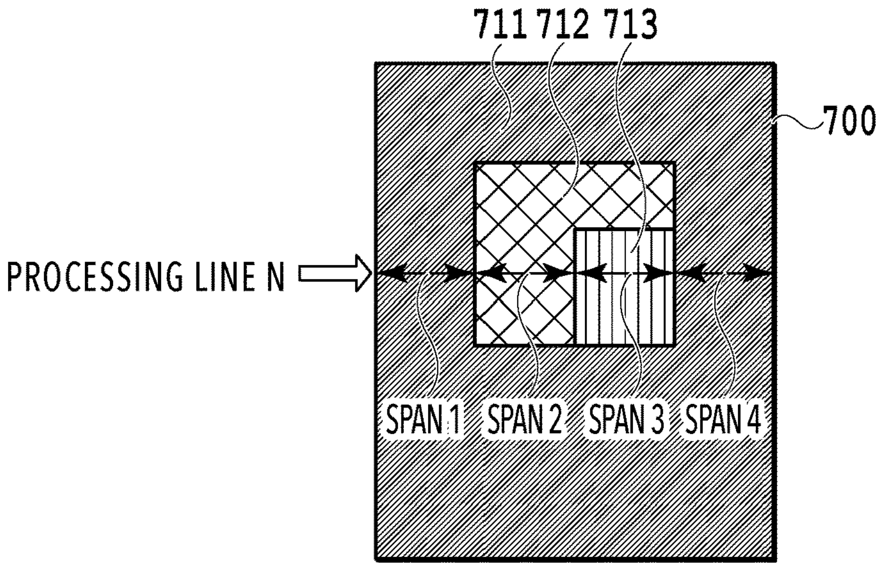

FIG.9A

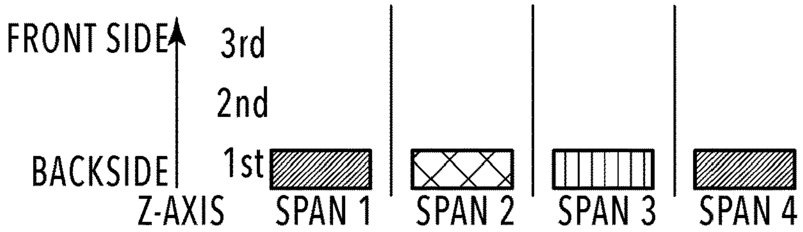

FIG.9B

PROCESSING LINE N

| | | |
|---|---|---|
| SPAN 1 | Pixel length : 1260pix<br>Object number : 1 | Fill type : image (backside)<br>Combination : overwriting |
| SPAN 2 | Pixel length : 1300pix<br>Object number : 1 | Fill type : image<br>Combination : overwriting |
| SPAN 3 | Pixel length : 1150pix<br>Object number : 1 | Fill type : image<br>Combination : overwriting |
| SPAN 4 | Pixel length : 1250pix<br>Object number : 1 | Fill type : image (backside)<br>Combination : overwriting |

FIG.9C

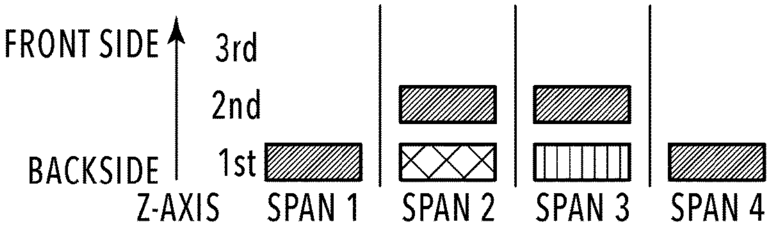

FIG.11A

PROCESSING LINE N

| | | | |
|---|---|---|---|
| SPAN 1 | Pixel length : 1260pix<br>Object number : 1 | Fill type : image (backside)<br>Combination : overwriting | |
| SPAN 2 | Pixel length : 1300pix<br>Object number : 1 | Fill type : image<br>Combination : overwriting | 1101: Fill type : image (backside, read and discard)<br>Combination : overwriting |
| SPAN 3 | Pixel length : 1150pix<br>Object number : 1 | Fill type : image<br>Combination : overwriting | 1102: Fill type : image (backside, read and discard)<br>Combination : overwriting |
| SPAN 4 | Pixel length : 1250pix<br>Object number : 1 | Fill type : image (backside)<br>Combination : overwriting | |

FIG.11B

IMAGE PROCESSING APPARATUS THAT PERFORMS RENDERING PROCESSING, METHOD OF RENDERING PROCESSING, AND STORAGE MEDIUM

BACKGROUND OF THE INVENTION

Field of the Invention

The present invention relates to rendering processing in a scan line image forming method.

Description of the Related Art

Conventionally, a method of forming an image of an object, such as an image, a graphic, and text, existing within a printing-target page in units of scan lines exists. In this scan line image forming method, in the case where a plurality of objects is included within a page, first, a closed area (span) demarcated by a contour of an object is detected. Then, from instructions to combine each object included in the detected span, image formation is performed after performing processing (hidden surface elimination processing) to eliminate an object unnecessary in drawing of each span. For example, Japanese Patent Laid-Open No. 2013-004032 has disclosed a technique to process a page on which objects, such as graphics, overlap at a high speed by deleting unnecessary overlap edges to reduce the number of objects.

A printing apparatus having received PDL data as printing instructions generates final print data by temporarily generating intermediate data (rendering processing). The maximum value of the memory capacity for storing this intermediate data is determined in advance. For example, in the case where the size of already-generated intermediate data exceeds the maximum value during generation of intermediate data of a certain page, the generation is temporarily stopped and an image (fallback image) in the bitmap format is generated from the already-generated intermediate data. Then, by deleting the already-generated intermediate, an empty area is produced in the memory, the data of the generated fallback image is compressed, and the image data after compression is stored in the memory in which an empty area is produced as intermediate data. Then, the generation of intermediate data of the page is resumed. This series of processing is called fallback processing.

In the case where the data of the fallback image generated and compressed by the fallback processing is decompressed later and then a bitmap image of the entire page is generated, conventionally, the decompressed image data is delivered by loading the image data onto a RAM area. However, access to the RAM area is performed via a bus, and therefore, the reading processing thereof requires much time. Consequently, it is considered to make use of a first-in-first-out memory (hereinafter, FIFO memory) that can be accessed without intervention of a bus in place of the RAM area to deliver decompressed image data. However, in the case where the FIFO memory is made use of for delivery of decompressed image data, it is not possible to appropriately read the decompressed image data of the fallback image in units of spans unless some processing is performed. Then, such a problem of defective reading of image data may occur similarly in the case of, for example, copy-forgery-inhibited pattern printing and form overlay printing.

SUMMARY OF THE INVENTION

The image processing apparatus according to the present invention is an image processing apparatus that performs rendering processing for forming an image by a scan line method, the image processing apparatus including: a span processing unit configured to generate span data corresponding to a span demarcated by a contour of an object existing on a scan line; an elimination unit configured to perform elimination processing of an object unnecessary for drawing in the span for the generated span data; and a generation unit configured to generate a bitmap image in units of pages by using pixel data necessary for drawing of each span based on the span data after the elimination processing, wherein the generation unit generates, in a case where a part of a specific image object within a page is eliminated by the elimination processing, the pixel data necessary for drawing of each span is generated by acquiring the pixel data corresponding to the part from a FIFO memory and then discarding the acquired pixel data corresponding to the part in accordance with instructions to read and discard the part included in the span data after the elimination processing.

Further features of the present invention will become apparent from the following description of exemplary embodiments with reference to the attached drawings.

BRIEF DESCRIPTION OF THE DRAWINGS

FIG. 8A to FIG. 8C are explanatory diagrams of span data;

FIG. 9A to FIG. 9C are explanatory diagrams of span data after hidden surface elimination;

FIG. 11A and FIG. 11B are diagrams showing a state where read and discard instructions are added to span data after hidden surface elimination;

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

[First Embodiment]

Figure 1:
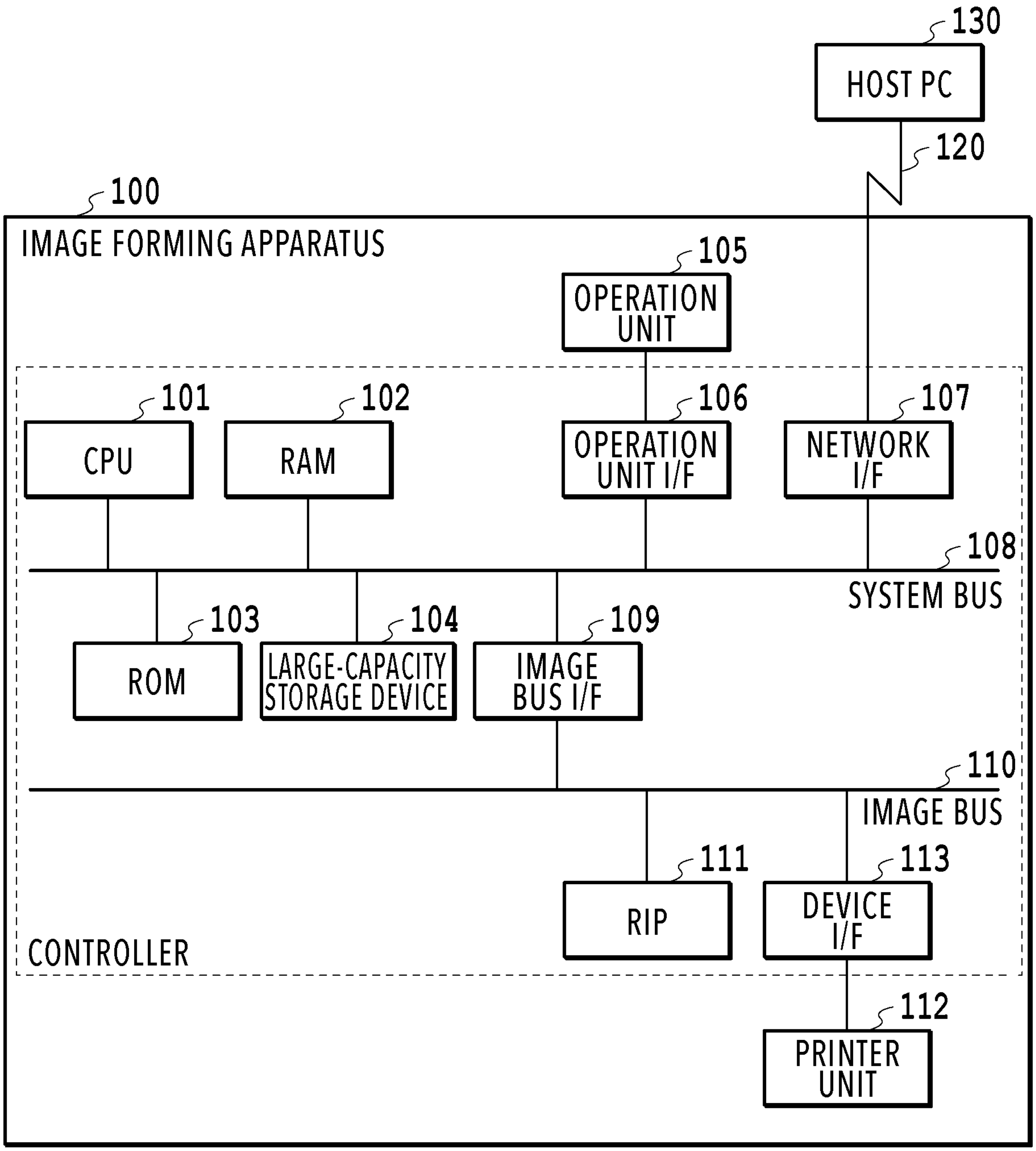
FIG. 1 is a diagram showing an example of a hardware configuration of an image forming apparatus.

First, a hardware configuration of an image forming apparatus according to the present embodiment is explained. FIG. 1 is a diagram showing an example of a hardware configuration of an image forming apparatus. An image forming apparatus 100 shown in FIG. 1 is connected with a host PC 130 via a LAN 120. A user who desires to perform printing generates a print job about a printing-target document in the host PC 130 and transmits the print job from the host PC 130 to the image forming apparatus 100 via the LAN 120. The print job includes PDL data described in a page description language, specifying how objects, such as a character, a photo (image), and a graphics, are arranged within a page. Because of this, a print job is also called print data. The image forming apparatus 100 may be an SFP (Single Function Printer) or an MFP (Multi Function Printer) including a plurality of functions. In the following, each unit making up the image forming apparatus 100 of the present embodiment is explained.

In FIG. 1, a broken-line rectangle indicates a controller of the image forming apparatus 100. The controller includes a CPU 101, a RAM 102, a ROM 103, a large-capacity storage device 104, an operation unit 105, an operation unit OF 106, a network I/F 107, a system bus 108, an image bus I/F 109, a RIP 111, and a device I/F 113. The CPU 101 is a processor that performs various kinds of operation processing and in charge of control of the entire image forming apparatus 100. The RAM 102 is a system work memory for the CPU 101 to operate. Further, the RAM 102 temporarily stores intermediate data generated by interpreting PDL data within a print job received from the host PC 130. Furthermore, the RAM 102 is also a work area at the time of performing rendering processing for intermediate data. The ROM 103 stores a boot program of the system, and the like. The large-capacity storage device 104 is, for example, a hard disk drive and stores system software for various kinds of processing and a print job received from the host PC 130.

The operation unit 105 has a display for displaying various menus, print data information, and so on and buttons and keys for a user to perform various input operations and is connected with the system bus 108 via the operation unit I/F 106. The network I/F 107 is an interface that performs transmission and reception of various kinds of data and information with an external device including the host PC 130 via the LAN 120. Each of these units is connected to the system bus 108. The image bus I/F 109 is an interface that connects the system bus 108 and the image bus 110 that transfers image data at a high speed and is a bus bridge that converts a data structure. To the image bus 110, the RIP (Raster Image Processor) 111 and a printer unit 112 are connected. The RIP 111 generates image data (bitmap image data) in the raster format, which is supplied for image formation in the printer unit 112, based on the intermediate data (DL: Display List) generated from the PDL data in accordance with instructions from the CPU 101. The printer unit 112 receives bitmap image data generated by the RIP 111 via the device I/F 113 and forms and outputs an image on a printing medium, such as paper.

Figure 2:
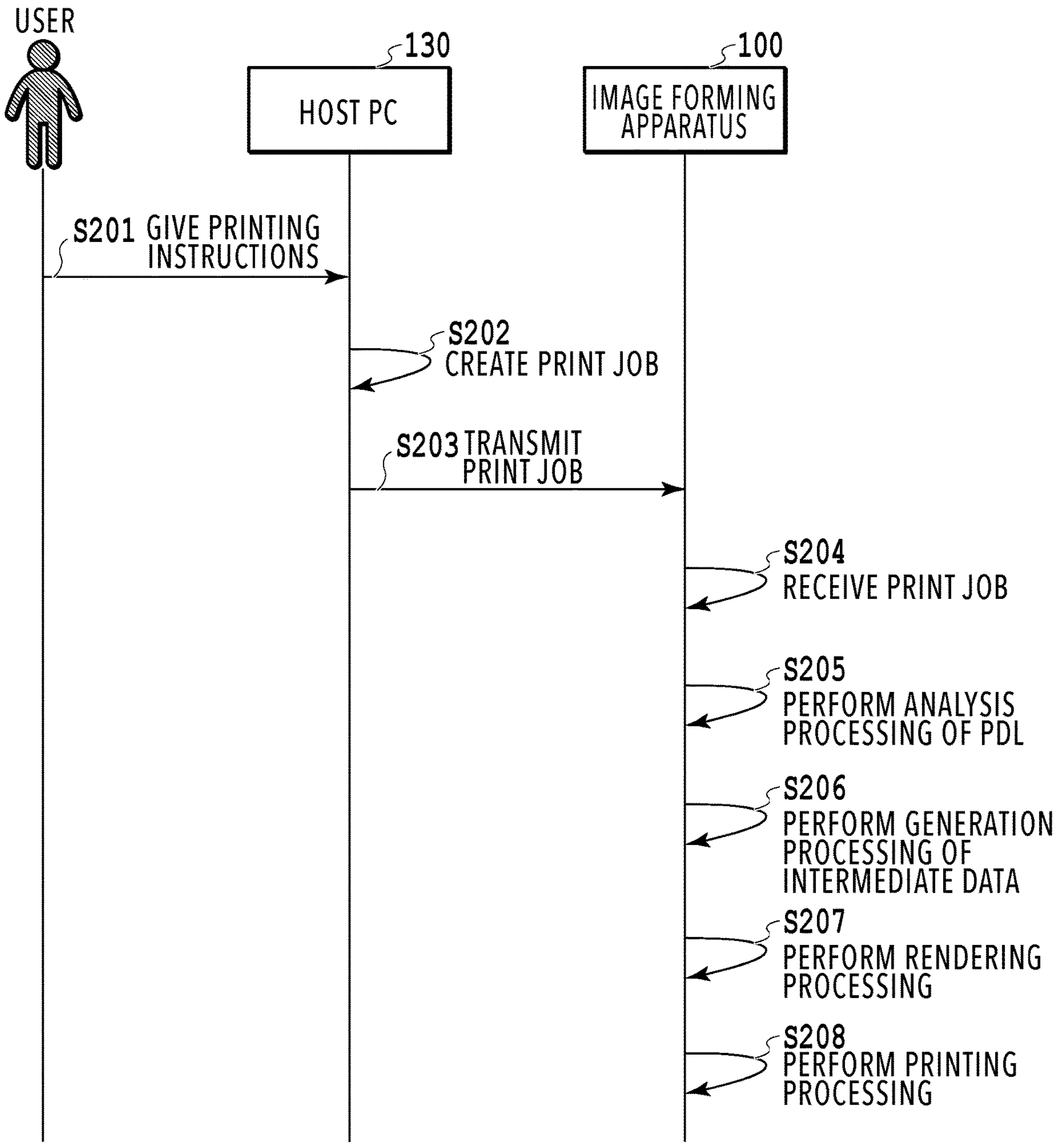
FIG. 2 is a diagram showing an example of a sequence of printing processing in a printing system.

FIG. 2 is a diagram showing an example of a sequence of printing processing in the printing system according to the present embodiment. A user specifies a document for which the user desires to perform printing on the host PC 130 and gives printing instructions (S201). Then, a printer driver (not shown schematically) on the host PC 130 creates a print job of the document for which the user gives printing instructions (S202) and transmits the print job to the image forming apparatus 100 (S203). Upon receipt of the print job from the host PC 130 (S204), first, the image forming apparatus 100 performs analysis processing of PDL included in the print job (S205). Next, the image forming apparatus 100 generates intermediate data based on the information on the analyzed PDL (S206). Then, the image forming apparatus 100 generates bitmap image data in units of pages by performing rendering processing based on the generated intermediate data (S207). The generated bitmap image data is subjected to predetermined image processing and transferred to the printer unit 112 and then printing processing is performed (S208).

<Software Configuration of Image Forming Apparatus>

Figure 3:
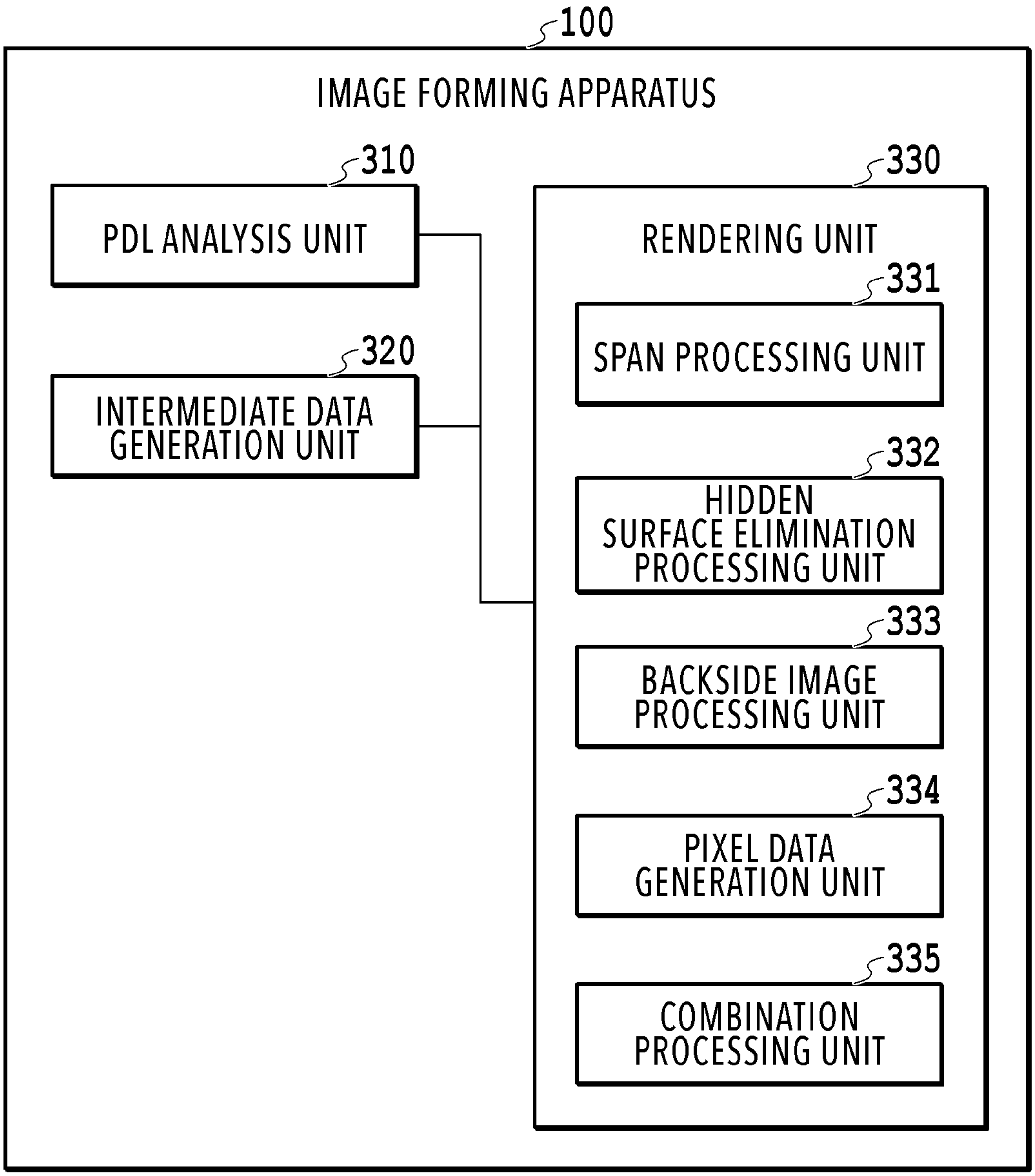
FIG. 3 is a function block diagram showing a software configuration of the image forming apparatus.

FIG. 3 is a function block diagram showing a software configuration of the image forming apparatus 100 according to the present embodiment. By three modules, that is, a PDL interpretation unit 310, an intermediate data generation unit 320, and a rendering unit 330, main image processing in printing processing is implemented.

The PDL interpretation unit 310 interprets the PDL within the print job received from the host PC 130 via the network I/F 107 and acquires page information and object information included in the page information. The acquired page information and object information are sent to the intermediate data generation unit 320.

The intermediate data generation unit 320 generates intermediate data including a drawing command of an object, and the like based on the page information and the object information received from the PDL interpretation unit 310. The generated intermediate data is sent to the rendering unit 330.

The rendering unit 330 generates bitmap image data in units of pages based on the intermediate data received from the intermediate data generation unit 320. The rendering unit 330 includes five modules, that is, a span processing unit 331, a hidden surface elimination processing unit 332, a backside image processing unit 333, a pixel data generation unit 334, and a combination processing unit 335.

The span processing unit 331 generates span data based on intermediate data. The span data includes information indicating a closed area (span) demarcated by a contour of an object located on a scan line and file information within the span.

The hidden surface elimination processing unit 332 performs processing (hidden surface elimination processing) to eliminate an object that is hidden by another object overlapping the front side thereof for the span data generated by the span processing unit 331 based on combination instructions as to the object existing in the span. By this hidden surface elimination processing, an object that is located at the backside of another object is deleted and span data including only objects that are necessary for drawing and located at the front side is generated.

The backside image processing unit 333 performs processing to make it possible to read and discard part of image data for span data in which a specific image object whose part has become a hidden surface elimination target because another object is located at the backside thereof exists. In the present specification, such a specific image object is called a "backside image". In the case where the data size of a backside image exceeds a predetermined size (size that largely affects the memory area), normally the data is compressed and then stored in a predetermined storage unit. In the present embodiment, explanation is given on the assumption that the backside image is stored in a compressed state, but this is not limited.

The pixel data generation unit 334 performs processing to generate image data (hereinafter, pixel data) representing an object to be drawn actually in each span in units of pixels based on span data. In this case, the above-described backside image is acquired while reading and discarding the unnecessary portion of the decompressed pixel data sent from a decompression processing circuit 420, to be described later, via a FIFO data transfer memory (hereinafter, FIFO memory).

The combination processing unit 335 performs processing to generate a final bitmap image of a page by combining the pixel data for each span generated by the pixel data generation unit 334.

<Internal Configuration of RIP>

Figure 4:
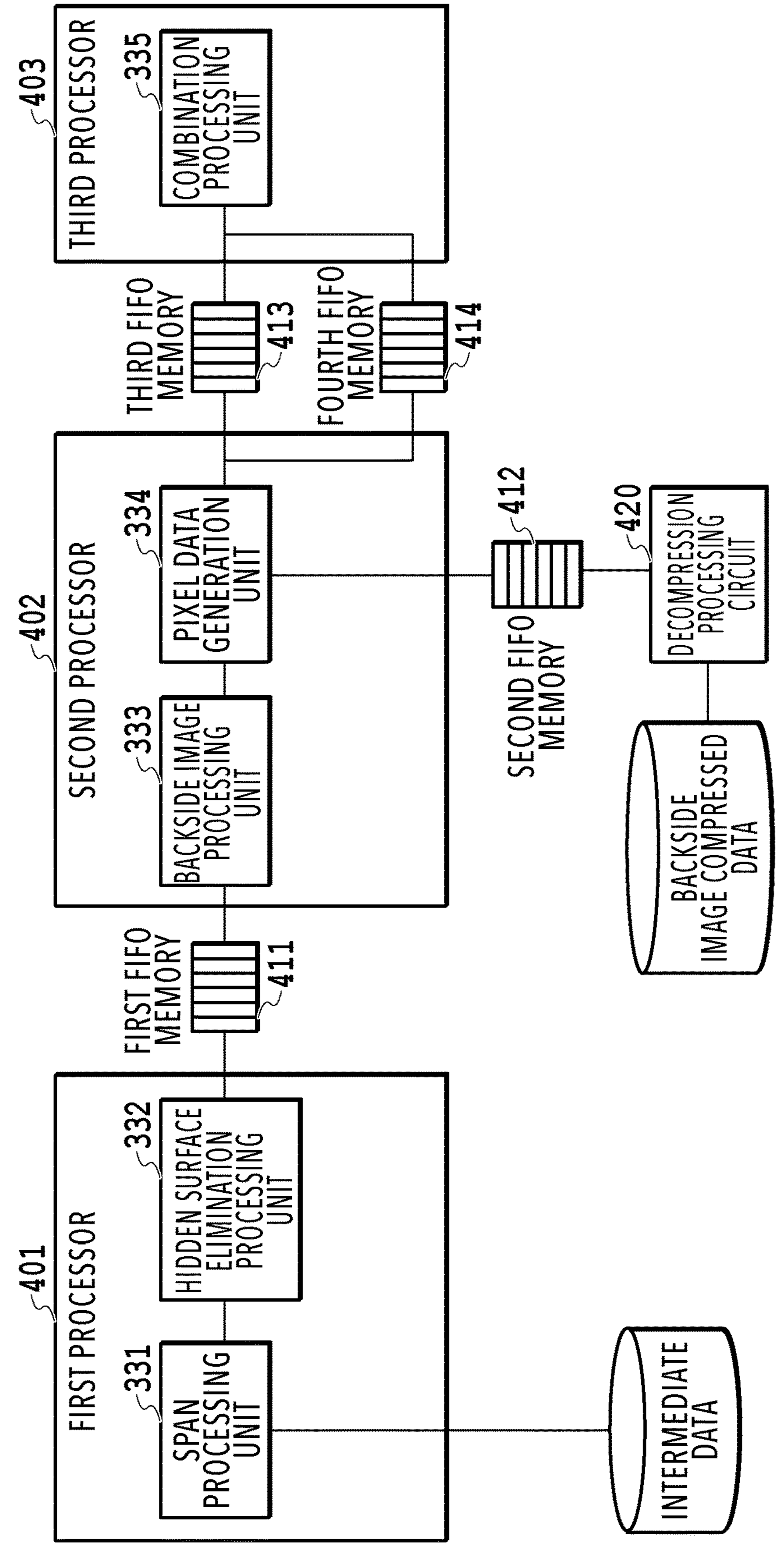
FIG. 4 is a diagram showing an internal configuration of a RIP.

Following the above, the RIP 111 that implements the above-described rendering unit 330 is explained in detail. FIG. 4 is a diagram showing an internal configuration of the RIP 111 according to the present embodiment. The RIP 111 includes three image forming processors, four FIFO memories, and one decompression processing circuit.

A first processor 401 is in charge of the functions of the span processing unit 331 and the hidden surface elimination processing unit 332 of the five modules of the rendering unit 330 described previously. Further, a second processor 402 is in charge of the functions of the backside image processing unit 333 and the pixel data generation unit 334. Furthermore, a third processor 403 is in charge of the function of the combination processing unit 335. Then, various instructions and data transfer performed between each processor are performed via first to fourth FIFO memories 411 to 414. The FIFO memory is implemented by an SRAM and the like that can be accessed at a high speed by FIFO communication. The configuration in FIG. 4 is merely an example. In the present embodiment, three processors are used, but the number of processors is not limited and it may also be possible for one processor to implement all the modules within the RIP 111 or for five processors corresponding to each of the above-described five modules to implement all the modules.

The decompression processing circuit 420 decompresses compressed data of the above-described backside image. The backside image that may be a compression target includes various images, in addition to the fallback image generated in the fallback processing described previously. For example, mention is made of a background image on a page of a document and the like created by the Office application of Microsoft Corporation, a background copy-forgery-inhibited pattern image in the copy-forgery-inhibited pattern printing, a form image in the form overlay printing, and so on. The data size of those images is comparatively large, and therefore, normally, those images are compressed and then stored. The image data in the raster format after decompression is transferred to the second processor 402 via the second FIFO memory 412. In the data transfer by the FIFO memory, the reception side receives data in the order in which the transfer side inputs data to the FIFO memory. That is, the data acquired by the second processor 402 on the data reception side is determined uniquely by the input order by the decompression processing circuit 420 on the transfer side, and therefore, it is possible for the second processor 402 to prepare in advance for receiving the data, and therefore, it is made possible to acquire data at a high speed. However, there are restrictions on the data transfer by the FIFO memory that even in the case where part of data that is transmitted is not necessary, it is not possible to acquire data of the necessary portion that is transmitted later unless the data of the unnecessary portion is acquired on the data reception side. The present invention premises the restrictions inherent in the FIFO memory such as this. It is assumed that for the preparation in advance for data reception and the transfer control of data, a mechanism for control is incorporated in the FIFO memory itself by using hardware. Further, it may also be possible to implement part (for example, the decompression processing circuit 420) or all of the configurations within the RIP 111 by using software.

<Flow of General Printing Processing>

Before explaining the rendering processing, which is the feature of the present embodiment, a flow of the general printing processing in the image forming apparatus 100 is reviewed. The printing processing is implemented by the CPU 101 reading a predetermined program stored within the ROM 103, loading the program onto the RAM 102, and executing the program.

In the case where a print job is transmitted from the host PC 130, first, in the PDL interpretation unit 310, analysis processing of PDL included in the print job is performed. Then, in the intermediate data generation unit 320, intermediate data is generated based on the analysis results. At this time, in the case where the capacity of the memory area for storing intermediate data runs short, the fallback processing described previously is performed. That is, in the case where it is determined that the total amount of intermediate data stored in the memory area for intermediate data exceeds a predetermined threshold value, first, an image (fallback image) in the bitmap format corresponding to a part of a plurality of objects within a page is generated. The generated fallback image is stored in the memory area for intermediate data after the data size thereof is reduced by compression processing, such as JPEG compression. Next, from the remaining objects within the page, intermediate data including the fallback image after compression as a background is generated and stored in the memory area for intermediate data. After this, based on the final intermediate data, in the rendering unit 330, a bitmap image of the entire page is generated. In this case, for example, on a condition that the fallback processing has been performed in the intermediate data generation stage, after decompressing the compressed fallback image, a bitmap image in units of pages whose background is the fallback image is generated. The generated bitmap image in units of pages is transferred to the printer unit 112 and printing processing is performed after predetermined image processing is performed therefor. The above is the flow of the general printing processing in the image forming apparatus 100.

<Details of Rendering Processing>

Figure 5:
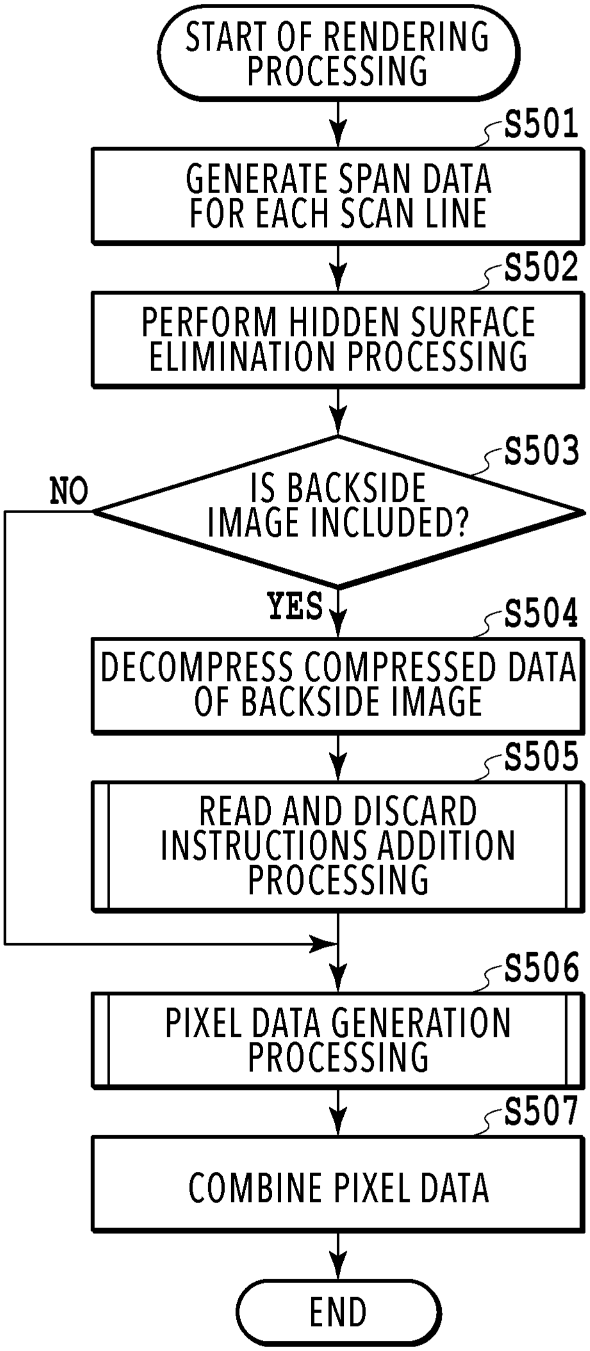
FIG. 5 is a flowchart showing a flow of rendering processing according to a first embodiment.
Figure 6:
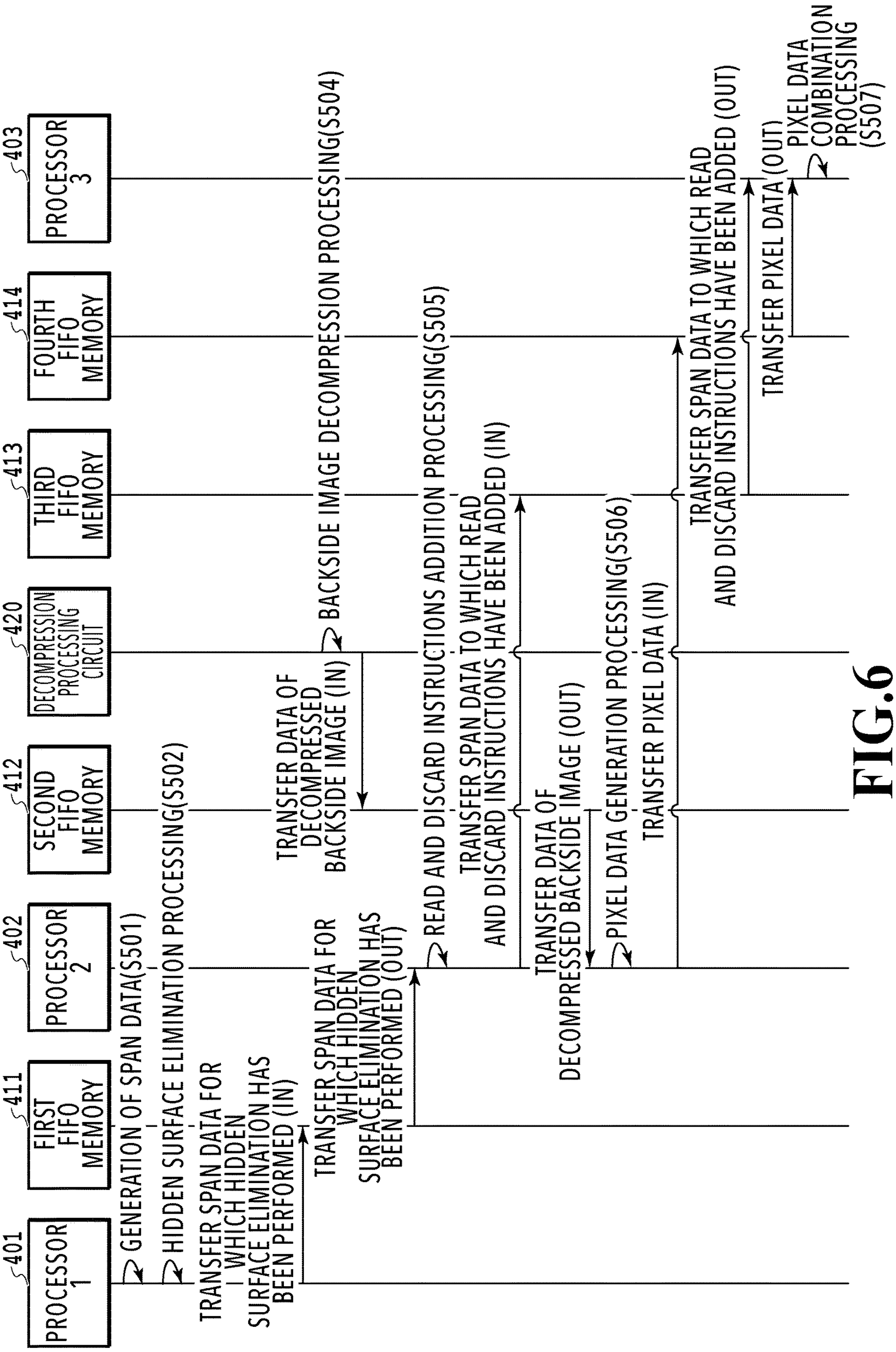
FIG. 6 is a sequence diagram showing a flow of data between each component within the RIP.
Figure 7A:
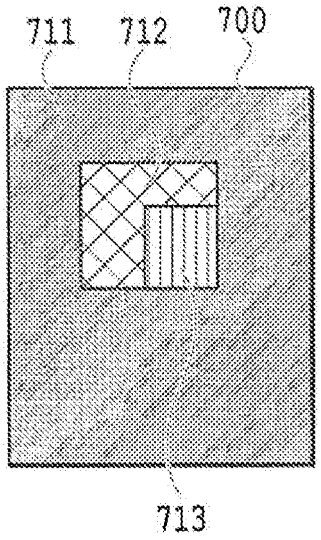
FIG. 7A and FIG. 7B are a printing-target page and a specific example of intermediate data thereof.
Figure 7B:
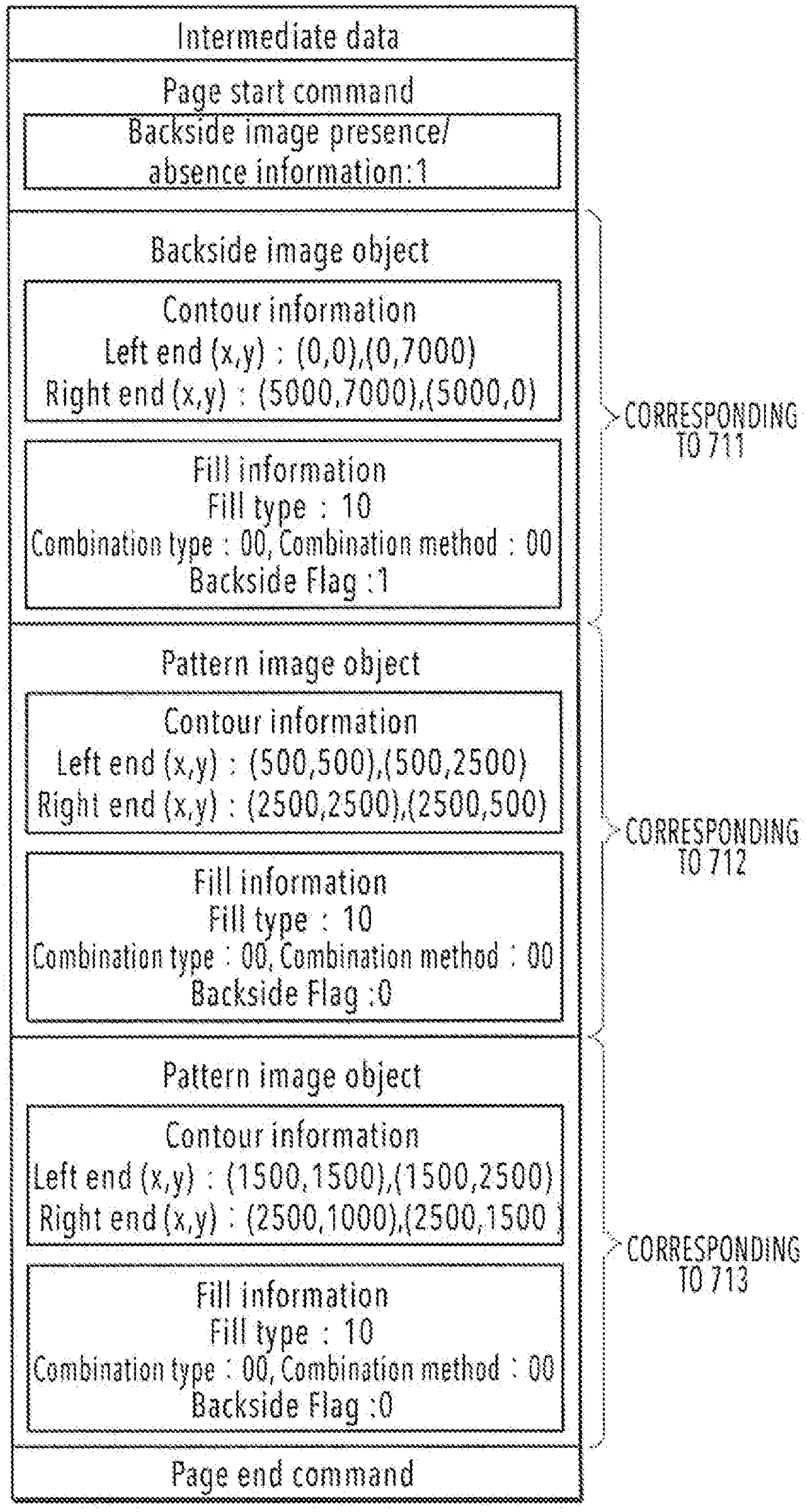

Next, the rendering processing performed by the RIP 11 is explained in detail, which is the feature of the present embodiment. FIG. 5 is a flowchart showing a flow of the rendering processing according to the present embodiment and FIG. 6 is a sequence diagram showing a flow of data between each component within the RIP 111. Further, FIG. 7A is a specific example of a printing-target page and FIG. 7B is intermediate data thereof. In the case where intermediate data is input to the RIP 111 from the intermediate data generation unit 320, the series of processing shown in the flow in FIG. 5 is performed. As a method of generating the final print data in accordance with intermediate data, in the present invention, the scan line method is used. In the scan line method, while performing hidden surface elimination for each line in the main scanning direction, a bitmap image of the printing-target page is generated. In the following, detailed explanation is given along the flow in FIG. 5.

At step 501, the first processor 401 as the span processing unit 331 generates span data for each scan line based on input intermediate data. As described previously, the span means a closed area surrounded by an edge, which is a boundary between objects that are drawn within a page or a boundary between an object and a background, on a single scan line. Then, span data includes information indicating this span and fill information on an object existing within the span. The length of a span is represented by, for example, the number of pixels. In this manner, in the order from the top scan line, span data corresponding to each scan line is generated.

Here, specific explanation is given by taking the case of the printing-target page shown in FIG. 7A and FIG. 7B as an example. A page 700 in FIG. 7A includes three image objects: a background image 711, which is the background of the entire page, and two kinds of pattern image, that is, a pattern image 712 with a diagonal grid and a pattern image 713 with vertical lines. Intermediate data shown in FIG. 7B corresponding to the page 700 starts with Page start command and ends with Page end command. Page start command includes "Backside image presence/absence information" indicating "1" in the case where the backside image described previously exists within the page and "0" in the case where the backside image does not exist. After Page start command, a drawing command of the background image 711, then, a drawing command of the pattern image 712, and then, a drawing command of the pattern image 713 follow. The drawing command of the background image 711 includes "Contour information" specifying the contour of the background image by the position coordinates of Left end and Right end thereof and "Fill information" indicating the contents of the backside image. Fill information includes "Fill type" indicating the attribute of the object, "Combination type" and "Combination method" indicating how to combine the object, and "Backside Flag" indicating whether the object is a backside image. Fill type is represented by two bits and is "00" in the case where the object attribute is character, "10" in the case of image, and "11", in the case of graphics. In the example of the page 700, the object attributes are all image, and therefore, Fill type is "10" for all the image objects. Combination type is also represented by two bits and is "00" in the case of the four basic operations of arithmetic and "01" in the case of alpha transparency. Then, in the case where Combination type is the four basic operations of arithmetic, as a value specifying Combination method, "00" is added in the case of overwriting, "01" in the case of AND writing, "10" in the case of OR writing, and "11" in the case of XOR writing. In the example of the page 700, all the objects are overwriting by the four basic operations of arithmetic, and therefore, Combination type is "00" and Combination method is "00" for all the image objects. Although not existing in the page 700, in the case where Combination type of the object is alpha transparency, as Combination method, a value indicating the transparency thereof is added. Then, as to Backside Flag, "1" is set for the backside image 711 and "0" is set for the pattern images 712 and 713, respectively. Based on Intermediate data such as this, span data is generated for each scan line.

FIG. 8A to FIG. 8C show a specific example of span data for a processing-target scan line (hereinafter, processing line) in the page 700. For a processing line N shown in FIG. 8A, by referring to Contour information on the above-described three image objects 711 to 713, span data corresponding to span 1 to span 4 is generated. The object making up each span is different from one another as shown in FIG. 8B. For example, span 1 is made up of only the background image 711. Span 2 is made up of the background image 711 and the pattern image 712. Span 3 is made up of the background image 711, the pattern image 712, and the pattern image 713. Span 4 is made up of only the background image 711 as in the case of span 1. FIG. 8C shows a data structure of the span data of span 1 to span 4 on the processing line N. The span data is made up of two kinds of data, that is, basic data and object data. The basic data includes "Pixel length" indicating an area length of the span and "Object number" indicating the number of objects existing in the span. The object data is generated corresponding to the number of objects and includes information on "Fill type" and "Combination" of the object. For example, in the case of span 2, two pieces of object data are generated. The first object data corresponds to the background image 711 and in "Fill type", information indicating that the object is the image attribute and a backside image is input, and in "Combination", information indicating that the combination method is the four basic operations of arithmetic of overwriting is input. The second object data corresponds to the pattern image 712 and in "Fill type", information indicating that the object is the image attribute and real data thereof is input, and in "Combination", information indicating that the combination method is the four basic operations of arithmetic of overwriting is input. The method of performing image formation by demarcating a scan line into spans is widely known and the data structure of the span data is not limited to the above-described example.

At step 502 that follows, the first processor 401 as the hidden surface elimination processing unit 332 performs the hidden surface elimination processing described previously for the span data generated at step 501 and generates span data made up of only the objects necessary for drawing. In the configuration of the present embodiment in which the backside image processing unit 333 is provided separately from the hidden surface elimination processing unit 332, it may be possible to perform the hidden surface elimination processing by applying a publicly known technique, which is generally known. FIG. 9A to FIG. 9C are diagrams explaining span data after the hidden surface elimination for the processing line N. FIG. 9A is the same as FIG. 8A. FIG. 9B is a diagram corresponding to FIG. 8B and it is known that the objects other than the object located at the forefront are removed. For example, as to span 2, combination by "overwriting" is specified for the pattern image 712 located at the forefront, and therefore, drawing of the background image 711 located at the backside of the pattern image 712 is no longer necessary. Consequently, the object data in the span data after the hidden surface elimination of span 2 is only the object data corresponding to the pattern image 712 as shown in FIG. 9C. Similarly, as to span 3, combination by "overwriting" is specified for the pattern image 713 located at the forefront, and therefore, the pattern image 712 and the background image 711 located at the backside of the pattern image 713 are no longer necessary. Consequently, the object data in the span data after the hidden surface elimination of span 3 is only one piece of object data corresponding to the pattern image 713 as shown in FIG. 9C. The span data for which the hidden surface elimination processing has been performed as described above is transferred to the second processor 402 via the first FIFO memory 411.

At step 503, the second processor 402 as the backside image processing unit 333 determines whether or not a backside image exists as an object to be drawn within the processing-target page. Here, whether or not a backside image exists within the processing-target page is determined by referring to Backside Flag included in Intermediate data. To Backside Flag, "1" indicating a backside image is given in the case where a background copy-forgery-inhibited pattern image or a form image exists, in addition to the fallback image described previously, and "0" is given in the other cases and then Backside Flag is incorporated in Intermediate data. In the case where the value of Backside Flag is "1", it is determined that a backside image exists and the processing advances to step 504. On the other hand, in the case where the value of Backside Flag is "0", it is determined that no backside image exists and the processing advances to step 506.

At step 504, the second processor 402 as the backside image processing unit 333 gives instructions to decompress the compressed data of the backside image to the decompression processing circuit 420. The data of the backside image after decompression is pixel data in the bitmap format and for example, in the case of the above-described background image object 711, the data is the image data of the entire page, and therefore, the size is very large. The decompression processing circuit 420 directly delivers the pixel data of the backside image obtained by the decompression processing to the second processor 402 via the second FIFO memory 412.

Next, at step 505, the second processor 402 as the backside image processing unit 333 performs processing (hereinafter, read and discard instructions addition processing) to add instructions to read and discard an unnecessary portion of the decompressed pixel data of the backside image for the span data after the hidden surface elimination processing. This processing is performed for generating pixel data in units of spans without an error by appropriately not reading data of an unnecessary portion sent from the second FIFO memory 412 for the backside image that has been eliminated by the hidden surface elimination because of being unnecessary for drawing in the span. Details of this read and discard instructions addition processing will be described later.

At step 506, the second processor 402 as the pixel data generation unit 334 generates pixel data of the object existing in each span based on the span data after the read and discard instructions addition processing. Details of this pixel data generation processing will be described later. Then, at step 507, the third processor 403 as the combination processing unit 335 performs necessary combination processing based on the pixel data generated at step 506 and generates a final bitmap image of the entire page. The above is the outline of the rendering processing performed by the RIP 111 according to the present embodiment.

<Details of Read and Discard Instructions Addition Processing>

Figure 10:
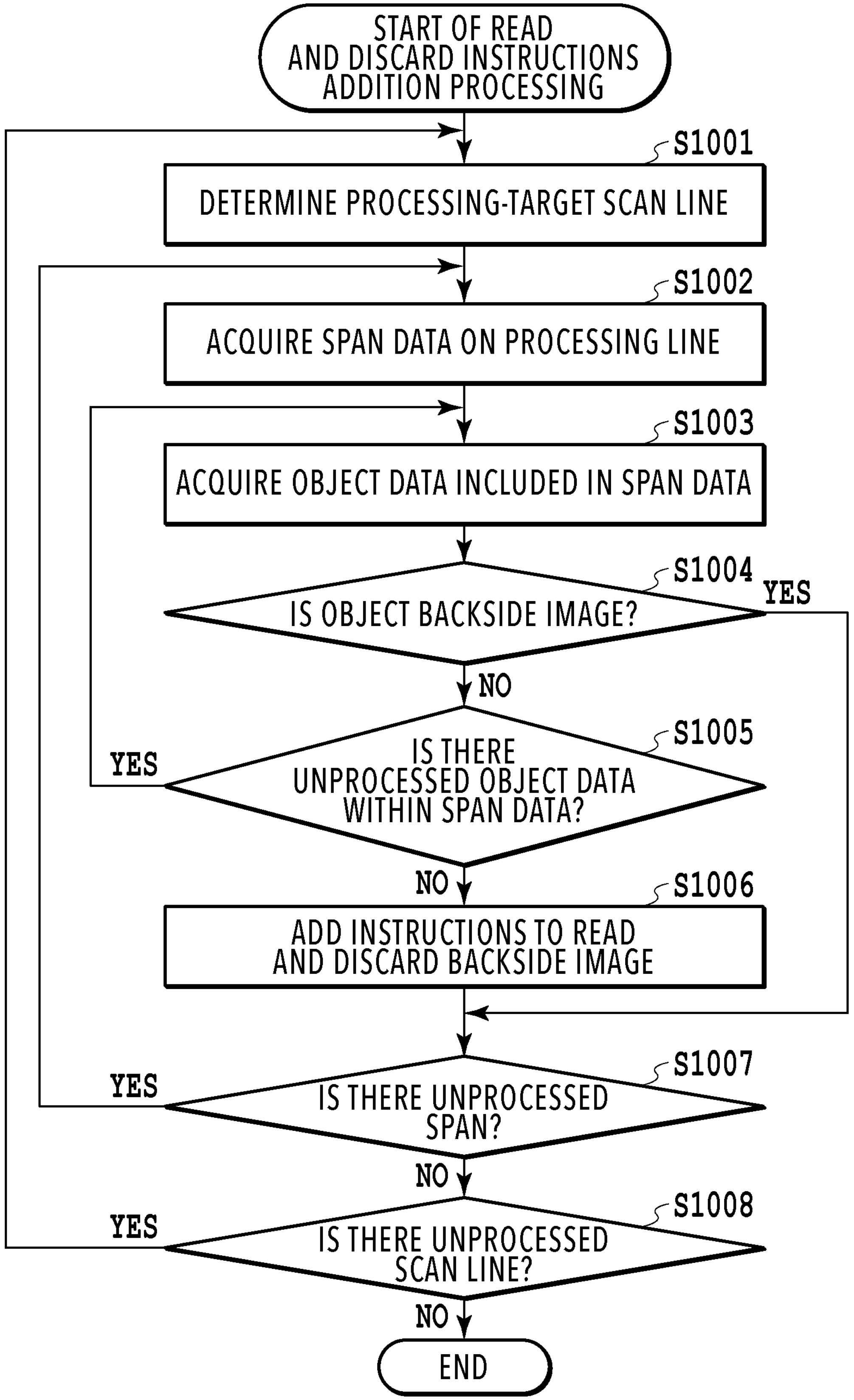
FIG. 10 is a flowchart showing details of read and discard instructions addition processing.

FIG. 10 is a flowchart showing details of the read and discard instructions addition processing at step 505 of the flow in FIG. 5. As described previously, this processing is performed by the second processor 402 as the backside image processing unit 333. In the following, explanation is given along the flow in FIG. 10.

At step 1001, a scan line (processing line) that is taken to be a target of processing within a page is determined. In the stage immediately after the start of processing, the top scan line in the image forming area of the page is determined to be the first processing line.

At step 1002, span data on the processing line, for which the hidden surface elimination processing has been performed, is received from the first FIFO memory 411 in the order from the span (in the example in FIG. 6, span 1) nearer to the scan start position. At step 1003 that follows, object data is acquired from the received span data. At this time, the object data is acquired sequentially toward the direction of the front side on the z-axis from the object located at the backside in the span.

Next, at step 1004, the information on Fill type within the acquired object data is referred to and whether or not the processing-target object is a backside image is determined. In the case where the processing-target object is not a backside image, the processing advances to step 1005 and in the case where the processing-target object is a backside image, the processing advances to step 1007.

At step 1005, whether or not there is unprocessed object data within the span data received at step 1002 is determined. In the case where the processing of all the object data has been completed, the processing advances to step 1006. On the other hand, in the case where there is unprocessed object data, the processing returns to step 1003, and the next object data is acquired and the processing is continued.

At step 1006, processing to add instructions (read and discard instructions) to appropriately read and discard the image data after decompression of the backside image transferred from the second FIFO memory 412 in the pixel data generation unit 334 to the span data is performed. FIG. 11A and FIG. 11B show the state where the above-described read and discard instructions are added to the span data (see FIG. 9C) after the hidden surface elimination. FIG. 11A corresponds to FIG. 9B and FIG. 11B corresponds to FIG. 9C, respectively. In this example, it is known that the backside image has been removed in span 2 and span 3, and therefore, new object data 1101 and 1102 including instructions to read and discard the backside image is added to the span data of span 2 and span 3, respectively.

At step 1007, whether or not the processing of all the span data on the processing line has been completed is determined. In the case where the processing of all the span data on the processing line has been completed, the processing advances to step 1008. On the other hand, in the case where there is unprocessed span data, the processing returns to step 1002, and the next span data is acquired and the processing is continued.

At step 1008, whether or not the processing has been completed for all the scan lines of the processing-target page is determined. In the case where the processing has been completed for all the scan lines of the processing-target page, this processing is terminated. On the other hand, in the case where there is an unprocessed scan line, the processing returns to step 1001, and the next scan line is determined to be processing line and the processing is continued. The above is the contents of the read and discard instructions addition processing.

<Details of Pixel Data Generation Processing>

Figure 12:
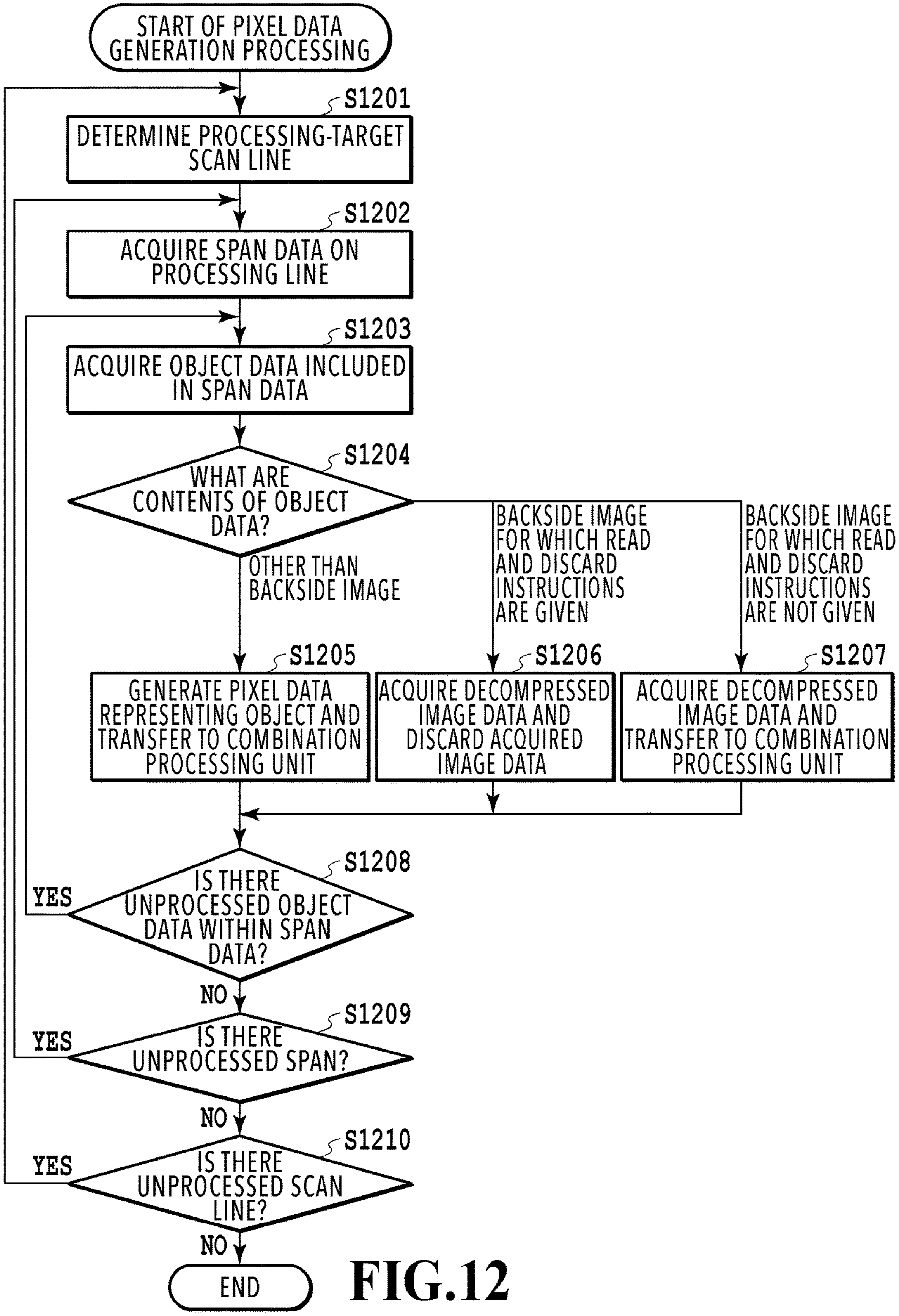
FIG. 12 is a flowchart showing details of pixel data generation processing.

FIG. 12 is a flowchart showing details of the pixel data generation processing at step 506 of the flow in FIG. 5. As described previously, this processing is performed by the second processor 402 as the pixel data generation unit 334. In the following, explanation is given along the flow in FIG. 12.

As step 1201, a scan line (processing line) that is taken to be a processing target within the page is determined. In the stage immediately after the start of processing, the top scan line in the image forming area within the page is determined to be the first processing line.

At step 1202 the span data on the processing line after the read and discard instructions addition processing is acquired in the order from the span (in the specific example described previously, span 1) nearer to the scan start position. Further, processing to transfer the acquired span data to the third processor 403 via the third FIFO memory 413 is also performed.

At step 1203, the object data included in the acquired span data is acquired. At this time, the object data is acquired sequentially toward the direction of the front side on the z-axis from the object located at the backside in the span. Further, processing to transfer the acquired object data to the third processor 403 via the third FIFO memory 413 is also performed, as in the case of the span data at step 1202.

At step 1204, the acquired object data is analyzed and the processing is branched according to the analysis results. In the case where the results of the analysis indicate that the object is an object other than a backside image, the processing advances to step 1205, in the case of an object of a backside image for which read and discard instructions are given, the processing advances to step 1206, and in the case of an object of a backside image for which read and discard instructions are not given, the processing advances to step 1207

At step 1205, pixel data in accordance with the attribute of the object is generated by making use of a publicly known technique. In the case, on a condition that the object is an object of the image attribute other than a backside image, the pixel data included in the object data is made use of as it is. Then, at step 1206, first, the decompressed pixel data of the backside image is acquired via the second FIFO memory 412. However, for the acquired pixel data, read and discard instructions are given, and therefore, the acquired pixel data is not necessary for drawing in the span. Because of this, this acquired pixel data is discarded without transferring to the third processor 403 that performs combination processing. On the other hand, at step 1207 also, first, the decompressed pixel data of the backside image is acquired via the second FIFO memory 412. For the acquired pixel data, no read and discard instructions are given, and therefore, the acquired pixel data is necessary for drawing in the span. Because of this, this pixel data is transferred to the third processor 403 that performs combination processing via the fourth FIFO memory 414.

At step 1208, whether there is unprocessed object data within the span data acquired at step 1202 is determined. In the case where there is unprocessed object data, the processing returns to step 1203, and the next object data is acquired and the processing is continued. On the other hand, in the case where the processing has been completed for all the object data, the processing advances to step 1209.

At step 1209, whether there is an unprocessed span on the processing line determined at step 1201 is determined. In the case where there is an unprocessed span, the processing returns to step 1202, and the next span data is acquired and the processing is continued. On the other hand, in the case where the processing has been completed for all the spans, the processing advances to step 1210.

At step 1210, whether there is an unprocessed scan line within the page is determined. In the case where there is an unprocessed scan line, the processing returns to step 1201, and the next scan line is determined and the processing is continued. On the other hand, in the case where the processing has been completed for all the scan lines within the page, this processing is terminated. The above is the contents of the pixel data generation processing.

<Modification Example>

In the above-described example, in the backside image processing unit 333 independent of the hidden surface elimination processing unit 332, the processing to add instructions to read and discard an unnecessary backside image to the span data after the hidden surface elimination is performed. Next, an aspect is explained as a modification example in which the hidden surface elimination processing unit 332 has also the function of the backside image processing unit 333.

Figure 13:
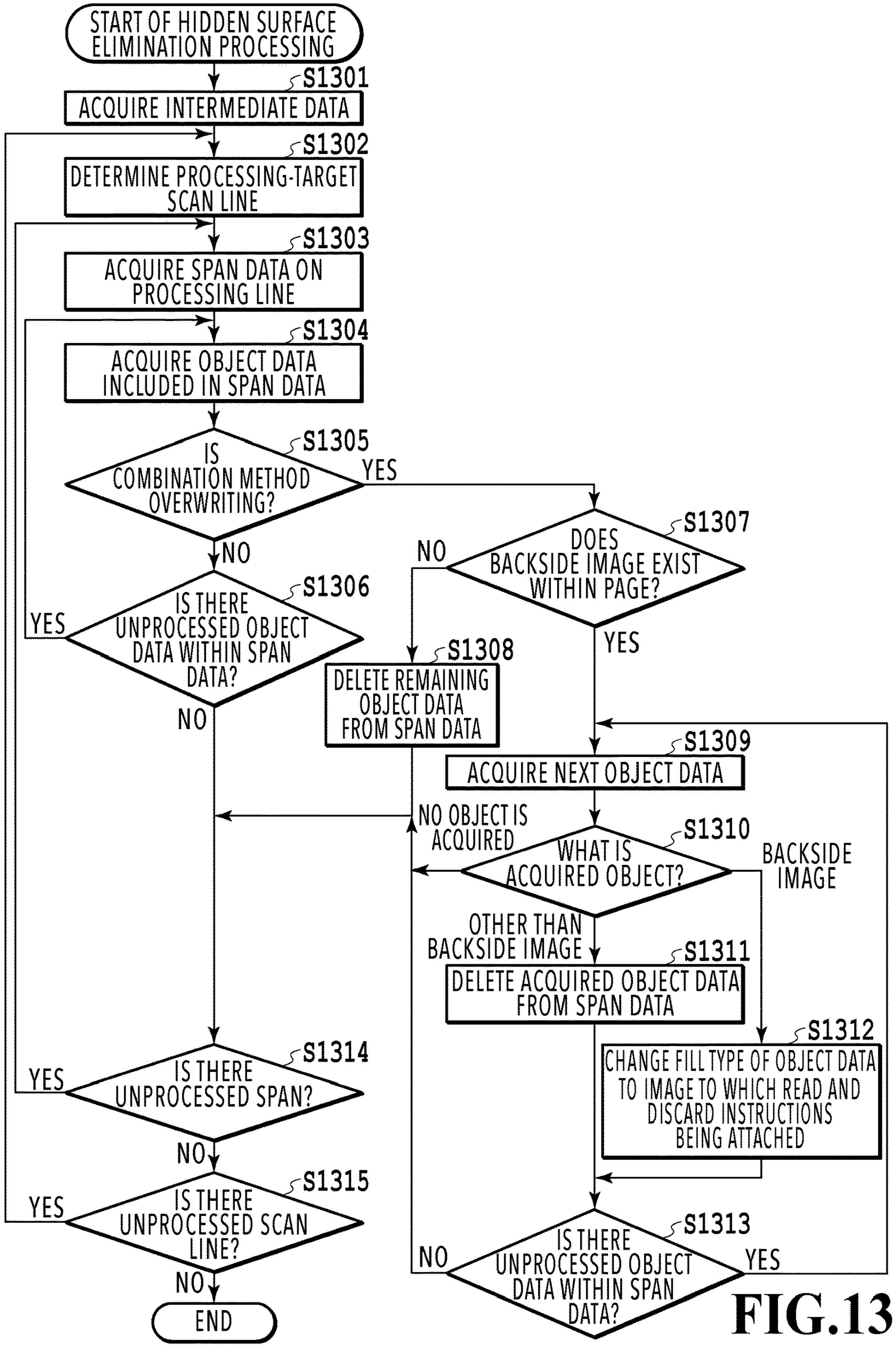
FIG. 13 is a flowchart showing a flow of hidden surface elimination processing according to a modification example.

FIG. 13 is a flowchart showing a flow of the hidden surface elimination processing according to the present modification example. In the case of the present modification example, in the hidden surface elimination processing, addition of read and discard instructions for an unnecessary backside image is also performed, and therefore, it is needless to say that step 505 in the flow in FIG. 5 is no longer necessary. In the following, detailed explanation is given along the flow in FIG. 13.

At step 1301, intermediate data of a printing-target page is acquired. Following this, a scan line (processing line) that is taken to be a processing target within the page is determined at step S1302. In the stage immediately after the start of processing, the top scan line at the uppermost end of the page is determined to be first processing line.

At step 1303, the span data on the processing line generated by the span processing unit 331 is acquired in the order from the span (in the specific example described previously, span 1) nearer to the scan start position. Then, at step 1304, the object data included in the acquired span data is acquired. At this time, the object data is acquired sequentially toward the direction of the backside on the z-axis from the object located at the front side in the span.

At step 1305, whether "overwriting" is specified as Combination method in the object data acquired at step 1304 is determined. In the case where Combination method is overwriting, the processing advances to step 1307. On the other hand, in the case where overwriting is not specified, the processing advances to step 1306.

At step 1306, whether there is unprocessed object data within the span data acquired at step 1303 is determined. In the case where there is unprocessed object data, the processing returns to step 1304, and the next object data is acquired and the processing is continued. On the other hand, in the case where the processing has been completed for all the object data, the processing advances to step 1314.

At step 1307, whether the object of a backside image exists within the page is determined. This determination is performed by referring to Backside image presence/absence information of Page start command in Intermediate data acquired at step 1301. In the case where a backside image exists within the page, the processing advances to step 1309. On the other hand, in the case where no backside image exists within the page, the processing advances to step 1308.

At step 1308, the unprocessed object data remaining in the span data acquired at step 1303 is deleted. In the case where no object data remains, this step is skipped and the processing advances to step 1304.

At step 1309, from the unprocessed object data remaining in the span data acquired at step 1303, next object data is acquired. At step 1310 that follows, the processing is branched according to the acquisition results of the object data at step 1309. Specifically, in the case where the object data of a backside image is acquired, the processing advances to step 1312, in the case where the object data of an image other than a backside image is acquired, the processing advances to step 1311, and in the case where no object data remains and no object data is acquired, the processing advances to step 1314.

At step 1311 in the case of an object other than a backside image, the object data acquired at step 1309 is deleted from the span data. Then, at step 1312 in the case of an object of a backside image, Fill type of the object data acquired at step 1309 is changed to image with read and discard instructions being attached.

At step 1313, whether there is unprocessed object data within the span data acquired at step 1303 is determined. In the case where there is unprocessed object data, the processing returns to step 1309 and further, the next object data is acquired and the processing is continued. On the other hand, in the case where the processing has been completed for all the object data, the processing advances to step 1314.

At step 1314, whether or not the processing of all the span data on the processing line has been completed is determined. In the case where the processing of all the span data on the processing line has been completed, the processing advances to step 1315. On the other hand, in the case where there is unprocessed span data, the processing returns to step 1303, and the next span data is acquired and the processing is continued.

At step 1315, whether or not the processing has been completed for all the scan lines of the processing-target page is determined. In the case where the processing has been completed for all the scan lines of the processing-target page, this processing is terminated. On the other hand, in the case where there is an unprocessed scan line, the processing returns to step 1302, and the next scan line is determined to be the processing line and the processing is continued. The above is the contents of the hidden surface elimination processing according to the present modification example. As described above, it may also be possible to incorporate the function of the backside image processing unit 333 in the hidden surface elimination processing unit 332.

As described above, according to the present embodiment, in rendering by making use of a FIFO memory, it is possible to appropriately read data of a backside image whose part is eliminated by hidden surface elimination processing and to implement higher-speed image formation by a scan line method.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in rendering in a scan line image forming method, it is possible to enable appropriate reading of image data in units of spans making use of a FIFO memory and to implement higher-speed image formation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-129154 filed Jun. 30, 2017, which is hereby incorporated by reference wherein in its entirety.

What is claimed is:

1. An image processing apparatus that performs rendering processing for forming an image, the image processing apparatus comprising:
   a controller having at least one processor which executes instructions stored in at least one memory, circuitry or combination of the at least one processor and the circuitry and being configured to:
      generate intermediate data based on print data described by a page description language (PDL);
      store, in a memory, a background image, wherein a bitmap image of a page is generated based on the stored background image and the generated intermediate data;
      generate, based on the generated intermediate data, first span data indicating a span on a processing line and one or more objects in the span;
      generate, based on the first span data, second span data by eliminating a part of the first span data corresponding to a part of the background image, in a case where an object based on the generated intermediated data and the part of the background image are included in one span and the part of the background image is not presented in the bitmap image of the page; and
      generate the bitmap image of the page based on the generated intermediate data, the stored background image, and the second span data,
   wherein, in generating the bitmap image of the page, the part of the background image in the memory is read out from the memory and is discarded.

2. The image processing apparatus according to claim 1, wherein
   the controller is further configured to:
      generate pixel data of the background image by decompressing compressed image data of compressed background image stored in the memory, and
   wherein in generating the bitmap image, the pixel data corresponding to the discarded part is acquired via a FIFO memory and is discarded without being used for generating the bitmap image.

3. The image processing apparatus according to claim 1, wherein
   the controller is further configured to:
      perform, in a case where a capacity of a first memory area for storing intermediate data runs short, a fallback processing in which a bitmap image of a part of objects in a page is generated as a fallback image based on intermediate data already stored in the first memory area and the generated fallback image is stored in a second memory area, and
   wherein the background image is the fallback image generated by the fallback processing.

4. The image processing apparatus according to claim 2, wherein
   the background image is a background copy-forgery-inhibited pattern image in copy-forgery-inhibited pattern printing.

5. The image processing apparatus according to claim 2, wherein
   the background image is a form image in form overlay printing.

6. The image processing apparatus according to claim 1, wherein the controller is further configured to add discard instructions to the second span data to which an elimination processing is executed.

7. A method of rendering processing for forming an image, the method comprising:

generating intermediate data based on print data described by a page description language (PDL);

storing a background image in a memory, wherein a bitmap image of the page is generated based on the stored background image and the generated intermediate data;

generating, based on the generated intermediate data, first span data indicating a span on a processing line and one or more objects in the span;

generating, based on the first span data, second span data by eliminating a part of the first span data corresponding to a part of the background image, in a case where an object based on the generated intermediated data and the part of the background image are included in one span and the part of the background image is not presented in the bitmap image of the page; and generating the bitmap image of the page based on the generated intermediate data, the stored background image, and the second span data, wherein, in generating the bitmap image of the page, the part of the background image is read out from the memory and is discarded.

8. A non-transitory computer readable storage medium storing a program for causing a computer to perform a method of rendering processing for forming an image, the method comprising:

generating intermediate data based on print data described by a page description language (PDL);

storing a background image in a memory, wherein a bitmap image of the page is generated based on the stored background image and the generated intermediate data;

generating, based on the generated intermediate data, first span data indicating a span on a processing line and one or more objects in the span;

generating, based on the first span data, second span data by eliminating a part of the first span data corresponding to a part of the background image, in a case where an object based on the generated intermediated data and the part of the background image is included in one span and the part of the background image is not presented in the bitmap image of the page; and generating the bitmap image of the page based on the generated intermediate data, the stored background image, and the second span data, wherein, in generating a bitmap image of the page, the part of the background image is read out from the memory and is discarded.

9. An image processing apparatus that performs rendering processing for forming an image, the image processing apparatus comprising:

a controller having at least one processor which executes instructions stored in at least one memory, circuitry or combination of the at least one processor and the circuitry and being configured to:

store, in a memory, a background image;

generate intermediate data for a foreground image based on print data described by a page description language; and generate a bitmap image of a page based on the generated intermediate data and the stored data of the background image, wherein, in generating the bitmap image of the page, in a case where on a processing line, the foreground image based on the generated intermediate data overlaps a part of the background image on one span, the part of the background image in the memory is read out from the memory and is discarded.

10. The image processing apparatus according to claim 9, wherein the controller is further configured to:

generate based on the print data intermediate data for the background image;

generate the background image based on the intermediate data for the background image; and generate the bitmap image of the page based on the generated background image and the intermediate data for the foreground image.

11. The image processing apparatus according to claim 9, wherein the controller is further configured to:

generate, based on the print data, intermediate data for the background image;

store the intermediate data for the background image in a first memory area; and perform a fallback processing in a case where a data size of the intermediate data stored in the first memory area exceeds a predetermined data size, wherein, in the fallback processing, a bitmap image of a part of the bitmap image of the page is generated as a fallback image based on the intermediate data already stored in the first memory area and the generated fallback image is stored in a second memory area, and wherein the background image is the fallback image generated by the fallback processing.

12. The image processing apparatus according to claim 11, wherein the intermediate data for the background image is erased in accordance with a generation of the background image and then the intermediate data for the foreground image is stored in the first memory area, and the bitmap image of the page is generated based on the stored background image and the intermediate data for the foreground image.

13. The image processing apparatus according to claim 9, wherein the background image is a background copy-forgery-inhibited pattern image in copy-forgery-inhibited pattern printing.

14. The image processing apparatus according to claim 9, wherein the background image is a form image in form overlay printing.

* * * * *